United States Patent [19]
Cros

[11] 4,252,041
[45] Feb. 24, 1981

[54] GUILLOTINE SHEARING MACHINE

[75] Inventor: Pierre G. Cros, Saint-Cloud, France

[73] Assignee: Promecam Sisson-Lehmann, Saint-Denis, France

[21] Appl. No.: 61,311

[22] Filed: Jul. 27, 1979

[30] Foreign Application Priority Data

Aug. 4, 1978 [FR] France ............................ 78 23073

[51] Int. Cl.³ .......................................... B26D 7/26
[52] U.S. Cl. ...................................... 83/157; 83/582; 83/588; 83/624; 83/635
[58] Field of Search ................ 83/157, 582, 588, 624, 83/625, 626, 635, 640

[56] References Cited
U.S. PATENT DOCUMENTS

| | | |
|---|---|---|
| 3,371,569 | 3/1968 | Pearson et al. ................. 83/635 X |
| 3,668,919 | 6/1972 | Hongo ............................. 83/639 X |

Primary Examiner—J. M. Meister
Attorney, Agent, or Firm—Michael J. Striker

[57] ABSTRACT

The shearing machine comprises a stationary apron and a moving apron carried by lateral upright members and provided with cutting blades, the moving apron being guided at both ends by means of roller devices adapted to cooperate with guide ramps mounted on bottom lateral extensions of the moving apron. The guiding devices are placed substantially at the level of the horizontal cutting plane while another guiding device is located in the bottom portion of the shearing machine. The extensions are adapted to receive and transmit the cutting power developed by jacks mounted on the stationary apron.

10 Claims, 9 Drawing Figures

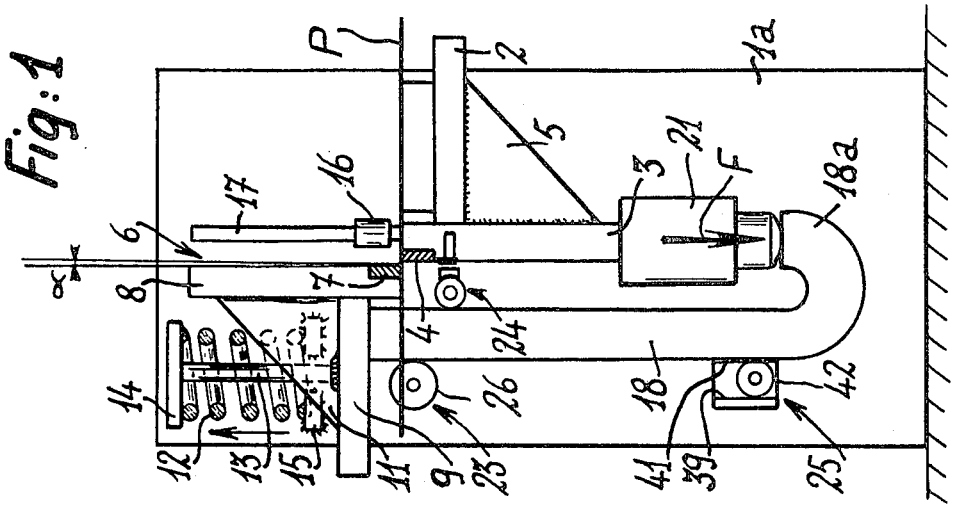
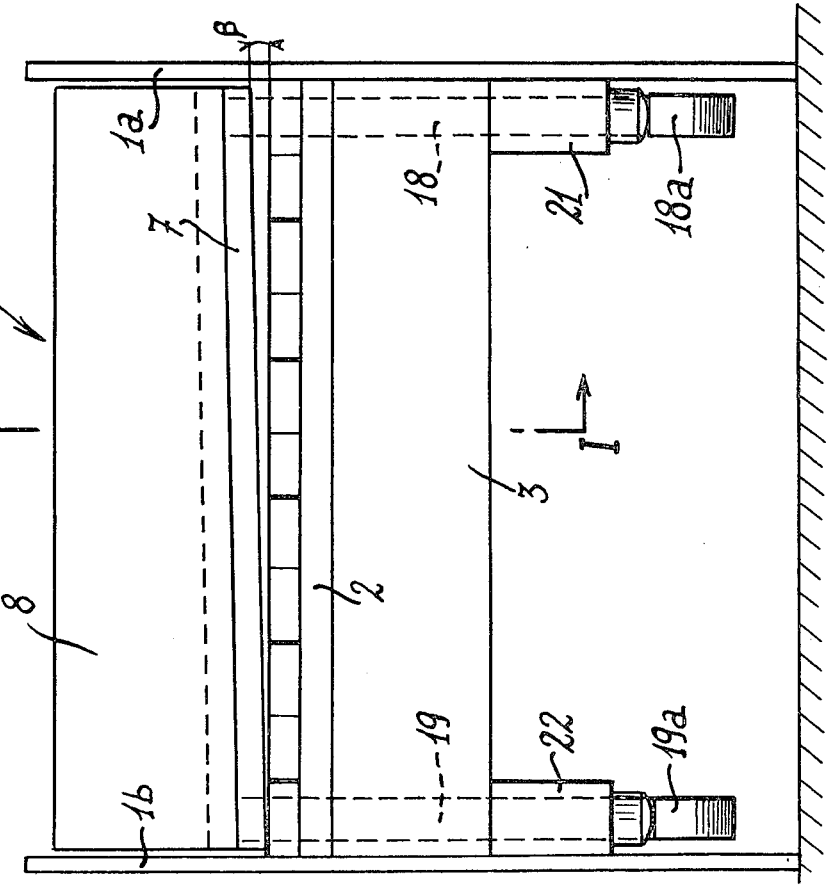

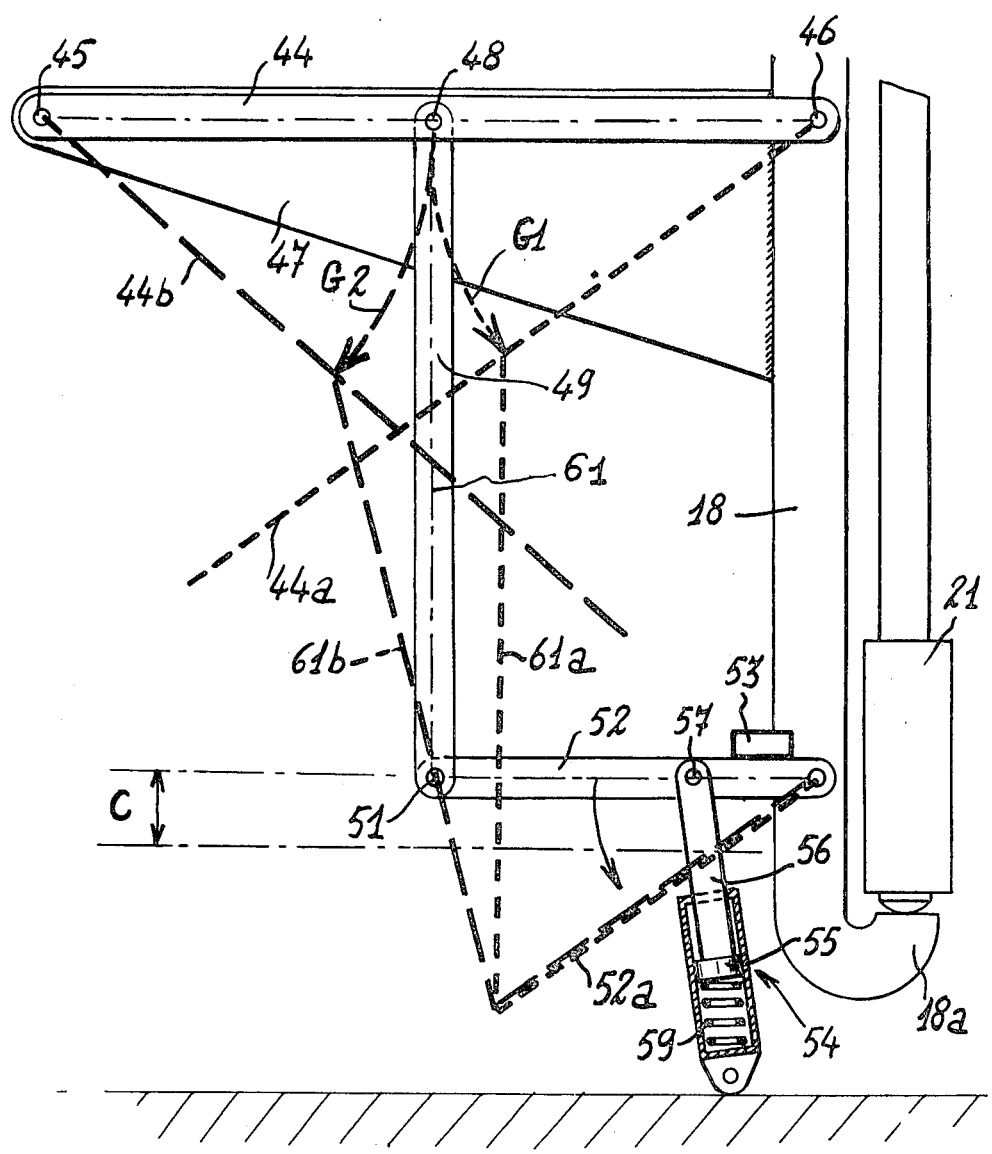
Fig:4

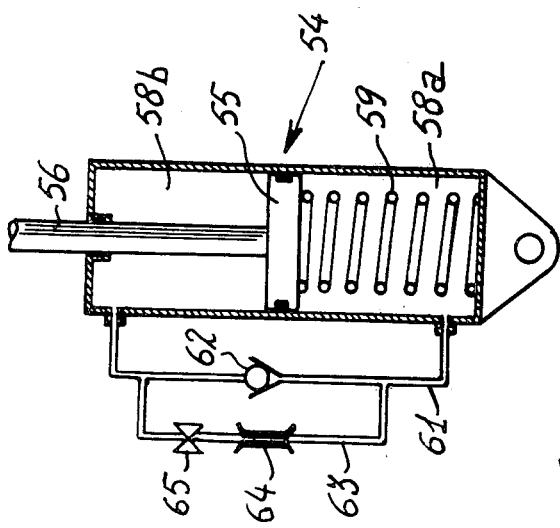
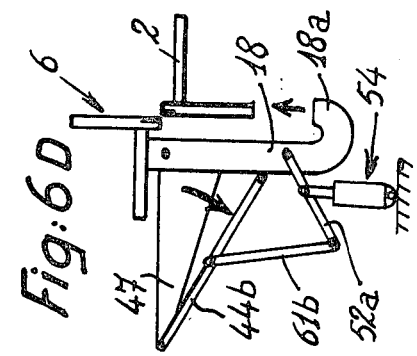
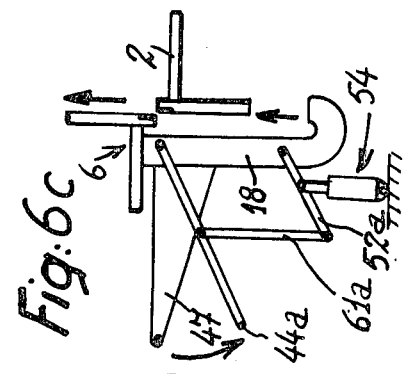
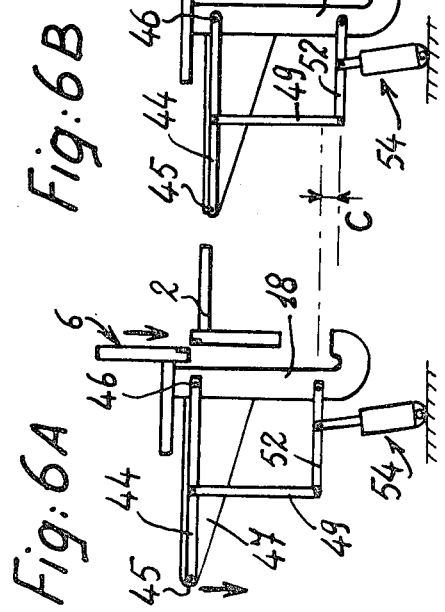

GUILLOTINE SHEARING MACHINE

This invention relates to a guillotine shearing machine for cutting metals in sheet form.

These guillotine shearing machines are composed of a frame made up of two upright members, a stationary apron and a moving apron guided on the frame.

The stationary apron is constituted by a bearing header or pallet for supporting the stationary blade and by a table mounted at right angles to the bearing header. The moving apron is guided in a vertical or slightly inclined plane and supports the moving blade.

Guiding devices are usually located on the moving apron proper. Moreover, the cutting force is imparted to the moving apron by means of a mechanical or hydraulic device located above or below said moving apron and adapted to produce action on this latter either directly or by means of link-arms which exert a thrust or a tractive force on said apron.

It is known that the shearing force applied to a metal sheet is accompanied by a couple which is absorbed by the sheet clamps and gives rise to a relatively high transverse horizontal force. The moving apron must therefore withstand this force by means of its guiding members.

As a result of constructional arrangements adopted in practice, however, said guiding members are usually located above the cutting plane. In consequence, no provision is made for any rigid support at the level of the cutting plane. This produces elastic deformations of the apron structure which impair the quality of cutting, thus resulting in rough edges and burrs on the metal sheet.

Furthermore, the moving apron is usually of substantial length with respect to its height. The apron acts as a beam which supports a load and its height is determined by calculation of strength of materials. In consequence, the guiding devices are of small length and therefore subjected to very high values of stress. Said devices are subject to rapid wear which increases the play between blades and also results in burred edges after shearing.

Finally, known shearing machines which are intended to cut thin metal sheets must be equipped with a sheet-holding device located to the rear of the vertical plane of the blades. It is in fact known that thin sheets of large size bend under the action of their own weight. When it is desired to shear the metal sheet which projects well to the rear of the blades, said sheet bends and passes out of the rear stop provided in the horizontal work plane. Steps must accordingly be taken to support said metal sheet behind the cutting plane and to ensure withdrawal of said support during the cutting operation in order to permit free movement of the metal sheet and subsequent removal.

Said sheet-holding device which must withdraw at the moment of cutting is actuated by means of a power supply which is independent of the machine.

The systems which have usually been employed up to the present time are either magnetic supports which hold the metal sheet by means of its top face or bottom supports which are independent of the shearing machine and are actuated by an ancillary source of energy such as compressed air or a hydraulic fluid.

The aim of the invention is to overcome these disadvantages by providing a shearing machine which makes it possible in particular to cut metal sheets without forming the burrs mentioned above.

To this end and in accordance with the invention, devices for guiding the moving apron are mounted substantially at the level of the horizontal cutting plane whilst other guiding devices are placed within the lower portion of the shearing machine, the guide ramps of said devices being rigidly fixed to lower lateral extensions of the moving apron, said extensions being adapted to receive and transmit the cutting power developed by jacks mounted on the stationary apron.

The arrangement of guiding devices and ramps which are of substantial overall length with respect to the height of the moving apron and some of which are also placed substantially at the level of the cutting plane results in a considerable reduction in wear of the guiding components and also eliminates elastic deformations which have a harmful effect on the moving apron structure, thus practically eliminating any cutting burrs on the metal sheet.

In more exact terms, the guide ramps of the devices mentioned in the foregoing are intended in accordance with the invention to have a total length which is greater than the height of the moving apron whereas guiding of said apron takes place over a distinctly shorter distance in shearing machines of known types.

In accordance with a further distinctive feature of the invention, the rollers of the guiding devices which are located substantially at the level of the horizontal cutting plane are adjustable in order to adjust the clearance between the cutting blades as a function of the thickness to be cut.

A certain number of rollers located at the level of the horizontal cutting plane are thus mounted on the rear faces of lateral extensions which are freely rotatable on eccentrics carried by spindles placed within the bores of the upright members, said rollers being applied against ramps arranged on the rear faces of the lateral extensions of the moving apron.

In accordance with an important feature of the invention, the guillotine shearing machine is equipped with a device for holding thin metal sheets of large size, said device being placed to the rear of the cutting plane behind the lower lateral extensions of the moving apron and supported by these latter; said sheet-holding device is so designed as to move downwards in synchronism with the moving apron in order to support the metal sheet during a cutting operation, then to withdraw at the moment of upward return of the moving apron so as to permit removal of the metal sheet whilst means are provided for automatically controlling said sheet-holding system solely by means of the jacks provided for driving the moving apron without any external addition of energy.

Thus the device for holding thin sheets has the advantage of supporting the sheet during the cutting operation and during downward motion of the moving apron. Said holding device can also be operated without making use of any external source of energy, especially by virtue of the fact that it is mounted on the lateral extensions of the moving apron.

In accordance with a further distinctive feature of the invention, the lateral extensions are provided with end portions bent back in the upward direction in the shape of crooks on which the working jacks exert a downward thrust in order to displace the moving apron in the downward direction.

Further distinctive features and advantages of the invention will become apparent from the following description. One embodiment of the shearing machine according to the invention is illustrated in the accompanying drawings which are given by way of example without any limitation being implied, and in which:

FIG. 1 is a view in lateral half-elevation and half-section along line I—I of FIG. 2 and illustrates the guillotine shearing machine according to the invention;

FIG. 2 is a view in front elevation of the shearing machine of FIG. 1;

FIG. 4 is a view in lateral elevation to a large scale illustrating the device for holding thin metal sheets of large size, said device being shown in the top position;

FIG. 5 is an enlarged view in half-section and half-elevation showing a damping jack in cooperating relation with the thin-sheet holding device for maintaining this latter in the bottom position during removal of metal sheets;

FIG. 6A is a diagrammatic view in elevation of the thin-sheet holding device in the top position;

FIG. 6B is a similar diagrammatic view showing the thin-sheet holding device in the bottom position when the moving apron is located at the bottom dead point;

FIGS. 6C and 6D are diagrammatic views which are similar to FIGS. 6A and 6B and show the two possible positions of the thin-sheet holding device correlatively with the two possible modes of removal of sheets towards the rear and towards the front of the shearing machine.

Figure 3:
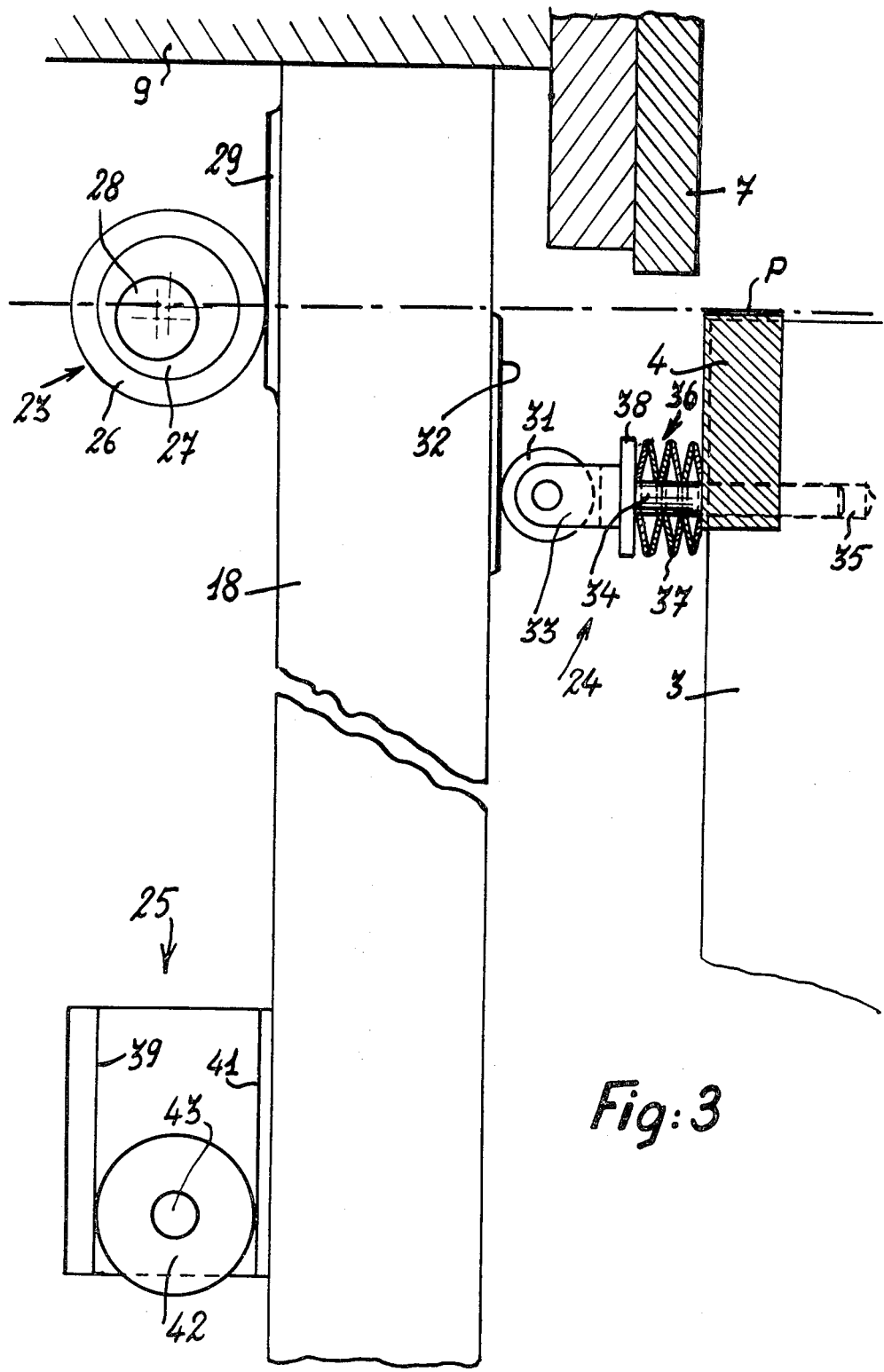
FIG. 3 is a view in half-section and half-elevation to a large scale showing the guiding devices of the moving apron.

The guillotine shearing machine illustrated in FIGS. 1 and 2 comprises two vertical side uprights 1a and 1b rigidly fixed to a stationary table 2 and to an apron 3 for supporting a stationary blade 4, the two components just mentioned being so arranged as to constitute a right-angled bracket braced by gusset plates 5.

The shearing machine further comprises an upper moving apron 6 provided with a cutting blade 7, said blade being inserted in the bottom portion of a vertical plate 8 which is rigidly fixed to a horizontal plate 9 associated with gusset plates 11.

The moving apron 6 is slightly inclined to the vertical at an angle $\alpha$ in order to prevent frictional contact of the blades 7 and 4 when the clearance is at a minimum value. The moving apron 6 is maintained in the top position by compression springs 12 disposed coaxially with guide rods 13 provided with top shouldered portions 14 to which the thrust of springs 12 is applied. The vertical rods 13 are rigidly fixed to the plate 9 of the moving apron whilst the lower ends of the springs 12 are applied against annular shoulders 15 rigidly fixed to the stationary upright members 1a and 1b of the frame of the shearing machine.

Said machine is thus equipped at each end of the moving apron 6 with an elastic restoring system for returning the moving apron to the top position.

Moreover, the quillotine shearing machine is provided with an assembly of sheet-clamping jacks 16 which are distibuted over the entire length of the machine and fixed on a front plate 17. Said jacks 16 which are arranged in a manner known per se are not illustrated in FIG. 2. The moving blade 7 is inclined to the horizontal at an angle $\beta$.

In accordance with the invention, the guillotine shearing machine is equipped with a plurality of devices for guiding the moving apron 6, said devices being mounted substantially at the level of the horizontal cutting plane P in which the sheet to be cut is intended to be received whilst further guiding devices are placed within the bottom portion of the shearing machine. All of these guiding devices are adapted to cooperate with guide ramps rigidly fixed to two bottom lateral extensions 18, 19 of the moving apron 6. Said extensions are adapted to receive and transmit the driving power or cutting power developed by two hydraulic jacks 21, 22 which are mounted on the stationary apron 3.

The shearing machine thus has two lateral extensions each mounted at one end of the moving apron 6 with a working jack 21, 22 associated with each lateral extension aforesaid. In the form of construction which is illustrated, the lateral extensions 18, 19 are provided with end portions 18a-19a which are bent back upwards in the shape of crooks and on which the jacks 21, 22 exert a downward thrust in order to displace the moving apron 6 in the downward direction.

The extensions 18, 19 are constituted by rectangular-section rods, the front and rear faces of which are provided with ramps forming part of the aforementioned guiding devices. Said devices are of three types:

a first pair of devices 23 positioned at the level of the cutting plane P on the rear faces of the lateral extensions 18, 19;

a second pair of guiding devices 24 located on the front face of the extensions 18, 19 between these latter and the stationary apron 3; and a third pair of guiding devices 25 mounted at the lower end of the lateral extensions 18, 19.

Said devices for guiding the moving apron 6 will now be described with particular reference to FIG. 3.

Each guiding device 23 comprises a roller 26 located in the horizontal plane P of the metal sheet, said roller being loosely mounted on an eccentric 27 fitted with an internal bearing spindle 28 which is mounted within a bore of the corresponding stationary upright member 1a or 1b. The roller 26 is thus in rolling contact without play with a corresponding guide ramp 29 formed on the rear face of the associated lateral extension 18 or 19 and reacts against the horizontal cutting force.

Each guiding device 24 is placed slightly below the cutting plane P between the stationary apron 3 and the corresponding upright member 18 or 19 and is made up as follows: said device comprises a roller 31 applied against a guide ramp 32 formed on the associated lateral extension 18 or 19; said roller 31 is carried by a yoke 33 having an extension in the form of a rod 34 slidably mounted within a bore 35 which is formed horizontally within the stationary apron 3. As a complementary feature, an elastic system 36 supported by said rod 34 and applied against the stationary apron 3 exerts on the roller 31 a resilient thrust which maintains said roller continuously applied against the ramp 32. In the example illustrated, the elastic system 36 is constituted by a stack of resilient washers such as the washer 37, said washers being compressed between the stationary apron 3 and an annular shoulder 38 which is coaxial with the rod 34 and which serves to transmit the thrust of the resilient washers to the roller 31.

The rod 34 and the roller 31 can thus have a certain range of horizontal displacement by virture of the fact that the rod 34 can penetrate into the bore 35 to a greater or lesser extent.

The guiding devices 25 located in the bottom region of the shearing machine are each constituted by two vertical guide ramps 39, 41 rigidly fixed to the corresponding lateral extension 18 or 19, a roller 42 being imprisoned with slight play between said ramps and capable of rotating about a pivot-pin 43 which is fixed to the corresponding upright member 1a or 1b. The slight clearance provided between the roller 42 and the ramps enables the roller to run either along the ramp 39 or along the ramp 41.

According to an important feature of the invention, the lateral extensions 18, 19 are adapted to support a device which serves to hold thin metal sheets of large size, which is placed to the rear of the cutting plane P and which will not be described with reference to FIGS. 4 and 5.

Said sheet-holding device which is shown in side elevation in FIG. 4 is so designed as to move downwards in synchronism with the moving apron 6 in order to support the metal sheet while a sheet-cutting operation is in progress, then to withdraw at the moment of upward return of the moving apron in order to permit removal of the sheet. As a complementary feature, means are provided for automatically controlling this holding system solely by means of the hydraulic jacks 21, 22 for driving the moving apron 6 without any need to supply external energy.

The device for holding thin metal sheets thus comprises an articulated frame which supports a platform 44 for receiving the metal sheet and is adapted to pivot about two parallel horizontal pins 45, 46 at the time of upward return of the moving apron in such a manner as to ensure that said platform 44 is inclined either forwards or backwards with a view to permitting removal of the cut metal sheet correlatively in the forward or backward direction.

Said sheet-holding device comprises two corner plates 47 each attached at right angles to a lateral extension 18, 19 and each provided with two pivot-pins 45, 46 at right angles to the plane of the corner plates. Said pivot-pins 45, 46 are retractable and serve to support the platform 44 which is provided with a third pivot-pin 40 placed between the pivot-pins 45, 46 aforesaid and parallel to these latter.

There is pivotally mounted at each end of the intermediate pin 48 a link-arm 49 which is in turn pivotally attached at the lower end 51 to a lever 52, said lever being in turn pivoted on the associated lateral extension 18 or 19. In the top position, the lever 52 is limited in its angular displacements by a stop constituted by a block 53 which is rigidly fixed to the corresponding lateral extension 18 or 19, with the results that the aforementioned elements 44, 49, 52 as well as the extension 18 of the moving apron form an articulated parallelogram.

Each of the two pivot-pins 45 and 46 can be withdrawn so as to permit the articulation of the platform 34 about the pin which is not withdrawn.

The bottom lever 52 is pivotally coupled and adapted to cooperate with anchoring means, with the result that said means retain the pivot-pin 57 in the bottom position when the moving apron 6 has reached the bottom dead point of its travel and during its upward travel in order to cause pivotal displacement of the parallelogram and thus to remove the metal sheet.

In the case of each lever 52 of the articulated frame which has just been described, said anchoring means can be constituted by way of example in the following manner: a jack 54 is anchored at one end to the corresponding stationary upright member 1a or 1b and is provided with a piston 55 rigidly fixed to a rod 56, said rod being pivotally mounted on a pin 57 which is rigidly fixed to the lever 52.

The two chambers 58a, 58b (FIG. 5) of the jack 54 are filled with oil. The lower chamber 58a contains an elastic member 59 constituted by a restoring spring which urges the piston 55 and rod 56 to the top position. A first pipe 61 is connected to the two chambers 58a, 58b and fitted with a non-return valve 62 whilst a second pipe 63 provided with a calibrated orifice 64 and fitted with an electrovalve 65 is connected to the pipe 61. The non-return valve 62 is oriented in such a manner as to open in order to allow oil to pass from the lower chamber 58a to the upper chambers 58b when the piston 55 moves downwards and compresses the spring 59.

In the opposite direction, two cases can arise:
(a) the electrovalve 65 is closed: the non-return valve and the electrovalve 65 prevent any oil from passing from the chamber 58b to the chamber 58a, with the result that the piston 55 is maintained stationary:
(b) the electrovalve 65 is open, the oil flows through the calibrated orifice 64, the oil flow rate is reduced and the piston 65 is braked in its upward movement produced by the restoring spring 59 which expands.

This system therefore performs the double function of a locking device during upward displacement of the moving apron 6 and of damping device at the time of upward displacement of the platform 44.

The operation of the guillotine shearing machine and of the system for holding thin metal sheets will now be described hereinafter.

After the hydraulic working jacks 21 and 22 have been put under pressure, said jacks subject the end portions 18a, 19a of the lateral extensions 18, 19 to downwardly directed thrust forces (represented by the arrow F in FIG. 1) in opposition to the restoring springs 12. The extensions 18, 19 therefore move downwards during the working stroke. Throughout the duration of the stroke, the moving apron 6 is guided by the devices 23, 24, 25, the height of which is greater than that of the moving apron. The fact that the rollers 26 of the device 23 are located in the horizontal plane P of the metal sheet makes it possible to prevent any deformation of the moving system.

The substantial length of the guiding system from top to bottom as achieved in accordance with the invention could not be obtained with conventional means. Moreover, the fact that the lateral extensions 18, 19 are subjected to the effort exerted by the hydraulic jacks placed below the cutting plane P in an available zone advantageously reduces the overall height of the shearing machine.

The complete device for holding thin metal sheets as illustrated in FIG. 4 accompanies the moving apron over the entire range of travel C while compressing the spring 59 of the jack 54 and driving the oil from the chamber 58a to the chamber 58b. The metal sheet is therefore supported during the entire cutting operation.

FIGS. 6A and 6B illustrate respectively the positions of the moving apron and of its sheet-holding device at the beginning and at the end of the working stroke. When the bottom dead point has been reached, the electrovalve 65 is automatically closed by an electric end-of-travel contact (not shown in the drawings).

Starting from the aforesaid bottom dead point and when the moving apron 6 returns upwards, the piston 55 and the rod 56 are thus locked at the lower end of travel and maintain the pivot-pin 57 of the lever 52 in a stationary position.

As shown in FIG. 4, two cases can accordingly arise:

(a) the pivot-pin 45 has been withdrawn whilst the pivot-pin 46 is engaged in its bearing. The platform 44 pivoted on the pin 46 is rearwardly inclined to the position designated by the reference 44a, this pivotal displacement being indicated by the arrow G1 in FIG. 4. Correlatively, the axis 61 of the link-arm 49 takes up the position designated by the reference 61a whilst the lever 52 performs a downward pivotal movement about its fulcrum on the lateral extension 18 or 19 and takes up the position designated by the reference 52a.

(b) the pivot-pin 46 is withdrawn whilst the pin 45 is engaged within its bearing. The platform 44 tilts forward by pivoting about the pin 45 to the position designated by the reference 44b, this pivotal displacement being indicated by the arrow G2; the axis 61 takes up the position 61b and the axis of the lever 62 also moves into position 52a.

The first of the two above-mentioned positions of the platform 44 makes is possible after the cutting operation to remove metal sheets from the rear side of the shearing machine whilst the second position permits removal from the front side.

When the apron has reached the top dead point at the end of its upward travel, another end-of-travel contact or any other suitable detection system not shown in the drawings initiates opening of the electrovalve 65. The platform 44 which is pushed upwards by the spring 59 through the intermediary of the lever 52 and the link-arm 49 returns to the horizontal position in readiness to receive the metal sheet to be cut for the following cycle. This movement is damped by the calibrated orifice 64 as explained earlier.

It is worthy of note that the operating cycle which has just been described does not consume any power other than that required for the operation of the shearing machine proper, that is to say the power developed by the working jacks 21 and 22, in contradistinction to shearing machines of known types.

The invention is not limited to the embodiment hereinabove described and can extend to many alternative forms of construction. Thus the jacks 21, 22 can be of the double-acting type, thereby dispensing with the restoring springs 12. Moreover, in order to retain and then release the point of articulation or of anchoring of the articulated parallelogram constituted by the fulcrum pin 57 of the lever 52, it is possible to replace the jack 54 and associated pipes 61, 63 by any other equivalent arrangement.

Moreover, the guiding device rollers such as those designated by the references 26, 42, 31 can be replaced by sliding or rolling shoes.

What is claimed is:

1. A guillotine shearing machine comprising a stationary apron and a moving apron carried by lateral upright members and provided with cutting blades, the moving apron being guided at both ends by guiding devices in cooperating relation with guide ramps, wherein the ramps for guiding the moving apron are located on lower lateral extensions of said moving apron, and wherein guiding devices are placed substantially at the level of the horizontal cutting plane whilst another guiding device is placed within the lower portion of the shearing machine in conjunction with the devices aforesaid, said extensions being adapted to receive and transmit the cutting power developed by jacks mounted on the stationary apron.

2. A guillotine shearing machine according to claim 1, wherein the guiding action produced by the devices aforesaid is exerted over a length exceeding the height of the moving apron.

3. A guillotine shearing machine according to claim 1, wherein the guiding devices are fitted with rollers located substantially at the level of the horizontal cutting plane and adjustable in order to adjust the clearance between the cutting blades as a function of the thickness to be cut.

4. A guillotine shearing machine according to claim 3, wherein a certain number of rollers located at the level of the horizontal cutting plane are mounted so as to be freely rotatable on eccentrics carried by spindles placed within bores of the upright members, wherein said rollers are applied against ramps arranged on the rear faces of the lateral extensions of the moving apron, wherein devices for guiding the moving apron are placed between the lateral extensions of said apron and the stationary apron slightly below the horizontal cutting plane, and wherein said devices are each constituted by a roller applied against a guide ramp provided on the associated lateral extension, said roller being carried by a yoke extended by a rod slidably mounted within the stationary apron whilst a complementary elastic system supported by said rod and applied against the stationary apron exerts on the roller a resilient thrust which maintains said roller continuously applied against the associated ramp.

5. A guillotine shearing machine according to claim 1, wherein the guiding devices located within the bottom region of the shearing machine are each formed by two vertical ramps rigidly fixed to the corresponding lateral extension, a roller carried by the associated upright member being imprisoned with slight play between said vertical ramps.

6. A guillotine shearing machine according to claim 1, wherein the lateral extensions of the moving apron are provided with end portions bent back in the upward direction on which the working jacks exert a downward thrust in order to displace the moving apron.

7. A guillotine shearing machine according to claim 6, comprising a device for holding thin metal sheets of large size, said device being placed to the rear of the cutting plane and constituted by an articulated frame which is adapted to support a platform for receiving the metal sheet and to pivot about horizontal axes at the time of upward return of the moving apron, wherein said machine comprises means whereby the platform is tilted either forwards or backwards so as to permit removal of the cut metal sheet correlatively in the forward or backward direction, and wherein the device for holding thin metal sheets is made integral with the lower extensions of the moving apron.

8. A guillotine shearing machine according to claim 7, wherein the sheet-holding device comprises two corner plates each attached at right angles to a lateral extension of the moving apron and each provided with two parallel and horizontal retractable pivot-pins serving as platform supports, said platform being provided with a third pivot-pin which is placed between the other two pivot-pins in parallel relation thereto and on which is pivotally mounted a link-arm, the lower end of said link-arm being pivotally mounted on a lever which is in turn pivoted on the associated lateral extension, said lever being limited in the top position in its angular displacements by a stop rigidly fixed to the corresponding lateral extension so that the elements aforesaid including said platform constitute an articulated parallelogram.

9. A guillotine shearing machine according to claim 8, wherein the bottom lever of the parallelogram is pivotally attached to anchoring means in cooperating relation thereto so that said means retain the fulcrum of said lever on said means in the bottom position when the moving apron has reached the bottom dead point of its travel and during the upward return travel in order to displace the parallelogram in pivotal motion and to remove the metal sheet.

10. A guillotine shearing machine according to claim 9, wherein the means aforesaid are provided in the case of each bottom lever of the articulated frame with a jack which is anchored to the stationary upright member and the operating rod of which is pivotally attached to the lever, an elastic member placed within one of the two oil-filled chambers of said jack in order to urge the piston and piston rod continuously to the top position, a first pipe connected to the two jack chambers and fitted with a non-return valve, and a second pipe equipped with an electrovalve connected as a by-pass off the first pipe, said elements being so arranged that when the piston undergoes a downward displacement, the oil flows from the chamber containing said elastic member to the other chamber and opens the non-return valve whilst closure of the electrovalve locks the piston in the bottom position thereof when the moving apron is at the bottom dead point of its travel and during the upward return travel in order to cause pivotal displacement of the platform to a position of readiness for removal of the metal sheet.

* * * * *